United States Patent
Tseng

(10) Patent No.: US 10,863,316 B1
(45) Date of Patent: Dec. 8, 2020

(54) PREDICTING A PHYSICAL LOCATION OF AN ONLINE SYSTEM USER FROM MULTIPLE CANDIDATE PHYSICAL LOCATIONS BASED ON A GEOGRAPHIC LOCATION OF A CLIENT DEVICE ASSOCIATED WITH THE USER

(71) Applicant: Facebook, Inc., Menlo Park, CA (US)

(72) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/357,197

(22) Filed: Mar. 18, 2019

(51) Int. Cl.
| | |
|---|---|
| *H04W 4/029* | (2018.01) |
| *G06F 16/9536* | (2019.01) |
| *G06N 7/00* | (2006.01) |
| *H04L 29/08* | (2006.01) |
| *G06N 20/00* | (2019.01) |
| *H04L 12/58* | (2006.01) |
| *H04W 4/02* | (2018.01) |

(52) U.S. Cl.
CPC ........ *H04W 4/029* (2018.02); *G06F 16/9536* (2019.01); *G06N 7/005* (2013.01); *G06N 20/00* (2019.01); *H04L 67/22* (2013.01); *H04L 51/32* (2013.01); *H04L 67/306* (2013.01); *H04W 4/02* (2013.01)

(58) Field of Classification Search
CPC ....... H04L 67/306; H04L 67/22; H04L 51/32; H04W 4/02; H04W 4/21; H04W 4/021; H04W 4/029; G06N 20/00; G06N 7/005; G06F 16/9536
See application file for complete search history.

(56) References Cited

U.S. PATENT DOCUMENTS

| | | | | |
|---|---|---|---|---|
| 9,183,504 B2* | 11/2015 | Moore | ............... | G06Q 30/0259 |
| 2002/0077908 A1* | 6/2002 | Sakuma | ................ | G06Q 30/02 |
| | | | | 705/14.62 |
| 2008/0045236 A1* | 2/2008 | Nahon | .................... | H04W 4/12 |
| | | | | 455/456.1 |
| 2015/0039672 A1* | 2/2015 | Hussain | .............. | H04L 67/2819 |
| | | | | 709/202 |
| 2016/0147413 A1* | 5/2016 | Kao | ...................... | H04W 4/029 |
| | | | | 715/753 |
| 2016/0275401 A1* | 9/2016 | Cao | ......................... | H04L 51/32 |
| 2016/0300263 A1* | 10/2016 | Priness | .............. | G06Q 30/0261 |

* cited by examiner

*Primary Examiner* — Jaime M Holliday
(74) *Attorney, Agent, or Firm* — Fenwick & West LLP

(57) ABSTRACT

An online system receives information describing actions performed by online system users, in which the information describes an actual physical location at which each action was performed. The online system retrieves user attributes associated with each user and trains a machine-learning model to predict a physical location of a user based on the information received at the online system and the user attributes. The online system receives information describing a geographic location (e.g., GPS coordinates) from a client device associated with a viewing user of the online system and identifies candidate physical locations within a threshold distance of the geographic location. The online system then uses the trained model to predict a physical location of the viewing user from the candidate physical locations based on user attributes associated with the viewing user and presents content to the viewing user based on the predicted physical location.

20 Claims, 3 Drawing Sheets

PREDICTING A PHYSICAL LOCATION OF AN ONLINE SYSTEM USER FROM MULTIPLE CANDIDATE PHYSICAL LOCATIONS BASED ON A GEOGRAPHIC LOCATION OF A CLIENT DEVICE ASSOCIATED WITH THE USER

FIELD OF THE INVENTION

This disclosure relates generally to predicting a physical location of an online system user, and more specifically to predicting a physical location of an online system user from multiple candidate physical locations based on a geographic location of a client device associated with the user.

BACKGROUND

Various types of client devices (e.g., mobile phones, tablets, etc.) are capable of determining their own geographic locations. For example, smart phones often have features (e.g., built-in GPS) that allow them to determine their geographic locations in order to run various types of applications (e.g., navigation applications). Furthermore, these client devices may communicate information describing their geographic locations to other entities. For example, a tablet may communicate its GPS coordinates to a social networking system in a request to check-in to a physical location corresponding to the GPS coordinates.

Conventionally, to present content to online system users that is more likely to be relevant to the users, online systems may select content for presentation to the users based on information describing geographic locations of client devices associated with the users. For example, suppose that an online system receives a request to present content to a user of the online system in association with information describing a geographic location of a client device associated with the user that indicates that the client device is located at a movie theater. In this example, the online system may select content for presentation to the user based on the geographic location, such as content posted by other users of the online system to whom the user is connected, in which the content discusses movies recently seen by the users, their experiences at the movie theater, etc. Continuing with this example, the online system may then send the selected content for presentation to the user.

Although information describing geographic locations of client devices may be helpful when selecting content for presentation to online system users associated with the client devices, information describing a geographic location of a client device may correspond to multiple physical locations. For example, if a user of an online system is located at a store within a shopping center that includes several stores and the online system receives GPS coordinates of the shopping center from a client device associated with the user, the online system may be unable to determine the store at which the user is located from among the stores included within the shopping center. In this example, the online system may send content to the user associated with a store included in the shopping center at which the user is not located and which the user may not find relevant. Hence, online systems may fail to send relevant content to online system users due to their inability to disambiguate the physical locations of the users, which may degrade user experience.

SUMMARY

Conventionally, to present content to online system users that is more likely to be relevant to the users, online systems may select content for presentation to the users based on information describing geographic locations of client devices associated with the users. However, information describing a geographic location of a client device may correspond to multiple physical locations, such that online systems may be unable to determine the physical locations of their users. For example, in a shopping mall or in a crowded retail district, the physical merchant locations are within the accuracy or precision of conventional location services systems, like GPS. Accordingly, the systems cannot determine at which store among a group of nearby stores a user is located. Due to this inability to disambiguate the physical locations of online system users, online systems may fail to present content that is relevant to their users, which may degrade user experience.

To present content to online system users that is more likely to be relevant to the users, an online system predicts a physical location of an online system user from multiple candidate physical locations based on a geographic location of a client device associated with the user. More specifically, the online system receives information describing various actions performed by users of the online system, in which the information describes an actual physical location at which each action was performed. The online system retrieves a set of user attributes associated with each user who performed an action and trains a machine-learning model to predict a physical location of a user of the online system based on the information received at the online system and the set of user attributes. The online system then receives information describing a geographic location (e.g., GPS coordinates) from a client device associated with a viewing user of the online system. The online system identifies multiple candidate physical locations at which the client device may be located, in which the candidate physical locations are within a threshold distance of the geographic location. The online system uses the machine-learning model to predict a physical location of the viewing user from the candidate physical locations based on a set of user attributes associated with the viewing user. Once the online system has predicted a physical location associated with the viewing user, the online system sends content for presentation to the viewing user based on the predicted physical location.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
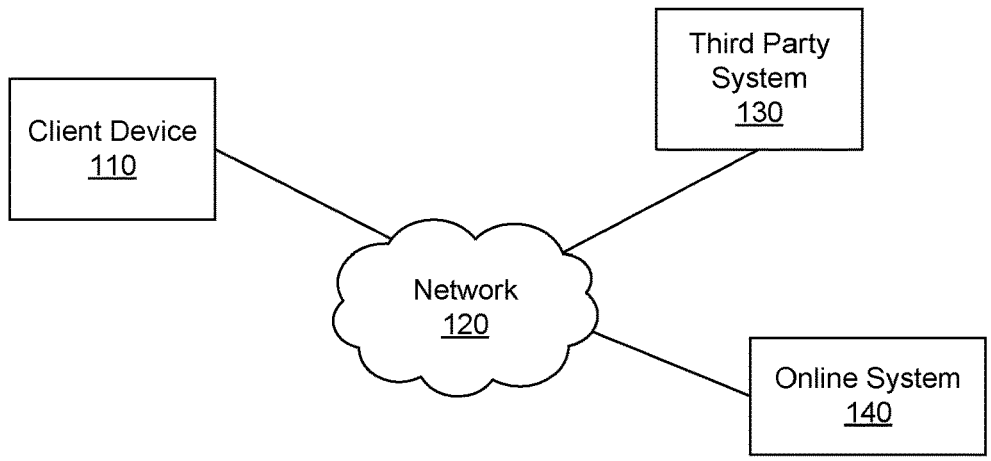
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

Figure 2:
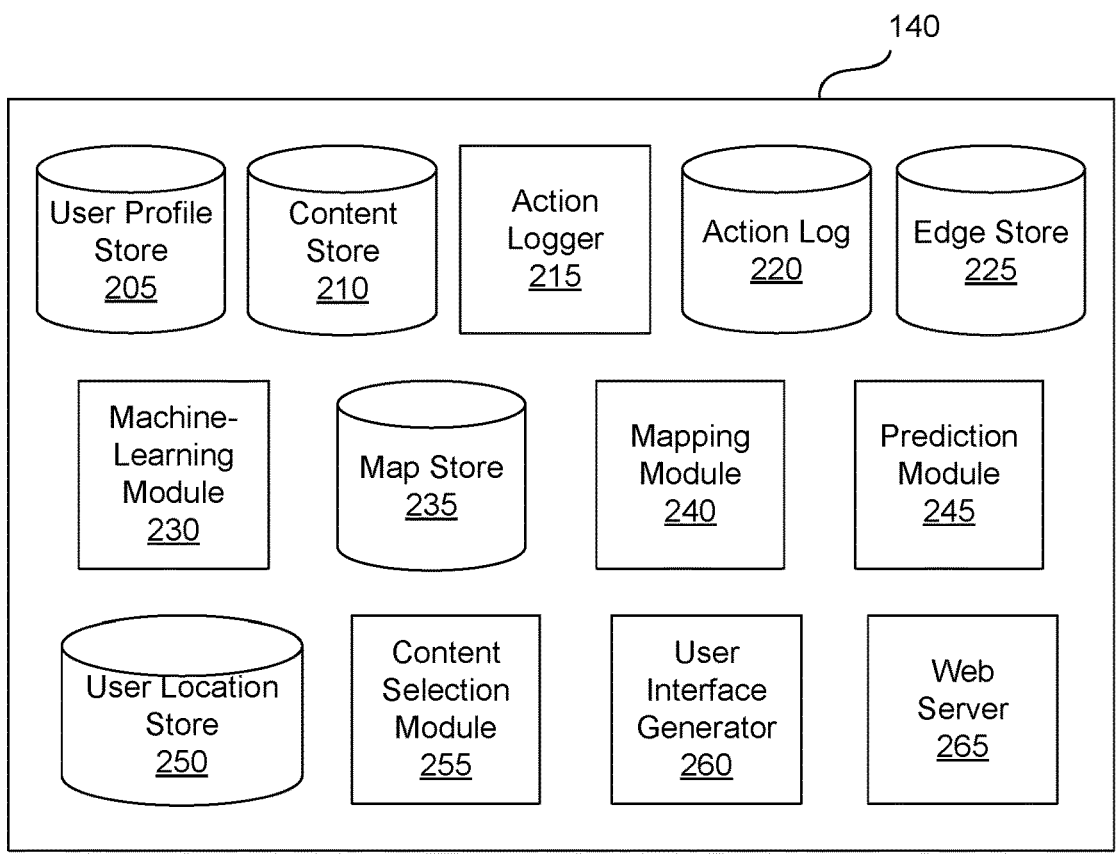
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a machine-learning module 230, a map store 235, a mapping module 240, a prediction module 245, a user location store 250, a content selection module 255, a user interface generator 260, and a web server 265. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image, with information identifying the images in which a user is tagged stored in the user profile of the user. A user profile in the user profile store 205 also may maintain references to actions by the corresponding user performed on content items in the content store 210 and stored in the action log 220.

In some embodiments, the user profile store 205 stores user-identifying information associated with online system users. User-identifying information may include personally-identifiable information, such as a full name, a home address, a phone number, an email address, a user identifier that is unique to a user in the online system 140 or in a third party system 130 (e.g., a username, a user identification number, or a cookie identifier), a client device identifier (e.g., an IP address), a browser identifier (e.g., a user agent), etc. User-identifying information also may include information that potentially may be combined with other personal information to identify an online system user, such as an age, a gender, a geographic region, etc. For example, user-identifying information associated with an online system user may include a combination of the user's first name, age, hometown, educational background, and occupation.

While user profiles in the user profile store 205 frequently are associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., a brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives (e.g., as shown in step 305 of FIG. 3) communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

Information received at the action logger 215 describing actions performed by users of the online system 140 also may describe the users, as well as physical locations and/or times associated with the actions. For example, if the action logger 215 receives information describing a check-in to a museum by a user of the online system 140, the information may include user-identifying information (e.g., a username or a user identification number) associated with the user. In this example, the information received at the action logger 215 also may include an address of a physical location of the museum and a timestamp indicating a date and time of day at which the online system user checked-in to the museum.

Information received at the action logger 215 describing actions performed by users of the online system 140 also may include other types of information associated with the actions. For example, suppose that the action logger 215 receives information describing a conversion event corresponding to a purchase of a product by a user of the online system 140 in the form of a receipt for the purchase. In this example, the receipt may include an address of a physical location of a retail store at which the product was purchased, a description of the product that was purchased (e.g., a product name, a product identification number, a quantity, model, size, price, and/or color of the product that was purchased), a time at which the product was purchased, etc. In embodiments in which information received at the action logger 215 includes additional types of information associated with actions performed by users of the online system 140, these additional types of information may be stored in association with user profiles of the users in the user profile store 205 and/or in association with information describing the actions in the action log 220. The functionality of the action logger 215 is further described below in conjunction with FIG. 3.

The action log 220 may be used by the online system 140 to track user actions in the online system 140, as well as actions in third-party systems 130 that communicate information to the online system 140. Users may interact with various objects in the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe the rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The machine-learning module 230 retrieves (e.g., as shown in step 310 of FIG. 3) user attributes associated with users of the online system 140 who performed actions associated with physical locations. User attributes associated with an online system user may include various types of information stored in association with a user profile of the user (e.g., in the user profile store 205), in association with information describing actions performed by the user (e.g., in the action log 220), in association with information describing connections established between the user and other online system users or objects maintained in the online system 140 (e.g., in the edge store 225), or in association with any other suitable types of information maintained in the online system 140. The machine-learning module 230 may retrieve user attributes associated with an online system user based on user-identifying information stored in association with the user attributes. For example, based on user-identifying information associated with users of the online system 140 included among information received at the action logger 215 describing actions performed by the users, the machine-learning module 230 may retrieve various types of user attributes associated with each user. In this example, user attributes associated with an online system user retrieved from the user profile store 205 may include demographic information associated with the user (e.g., age, gender, etc.) and hobbies or interests of the user. Continuing with this example, user attributes associated with the user retrieved from the action log 220 may include information describing actions previously performed by the user (e.g., previous check-ins to physical locations, previous conversions performed by the user, dates and/or times of the previous conversions, information describing geographic locations within a threshold distance of physical locations at which the previous conversions were performed, interactions by the user with content items previously presented to the user, etc.). In the above example, user attributes associated with the user retrieved from the edge store 225 may include information describing interactions between the user and other users of the online system 140 (e.g., a frequency with which messages have been sent between the users, a duration of connections established between the users, etc.).

The machine-learning module 230 also trains (e.g., as shown in step 315 of FIG. 3) a machine-learning model to predict a physical location of a user of the online system 140. The machine-learning module 230 may train the model based on information received at the action logger 215 describing actions performed by users of the online system 140 and a set of user attributes associated with each of the users. The machine-learning module 230 may train the model using various approaches (e.g., probabilistic matching or deterministic matching) and/or using various machine-learning algorithms. For example, the machine-learning module 230 may train the model using a classification algorithm, such as support vector machines, decision trees, etc. In some embodiments, the machine-learning module 230 may re-train the machine-learning model. For example, the machine-learning module 230 may periodically re-train the machine-learning model based on new information received at the action logger 215 describing various actions performed by users of the online system 140, in which the information describes an actual physical location at which each action was performed. In the above example, the machine-learning module 230 also or alternatively may re-train the model based on predicted physical locations of users of the online system 140. The functionality of the machine-learning module 230 is further described below in conjunction with FIG. 3.

The map store 235 stores information describing one or more maps of various geographic locations. Geographic locations described by the map(s) may be identified by GPS coordinates, names (e.g., names of countries, states, counties, cities, neighborhoods, streets, intersections, etc.), zip codes, landmarks, buildings, land formations, bodies of water, or any other suitable types of identifiers. For example, a map of a theme park maintained in the map store 235 may be identified based on GPS coordinates of the theme park. Maps of geographic locations may include various types of boundaries that separate different geographic or physical locations from each other (e.g., mountain ranges, property lines, walls of buildings, etc.). The map store 235 is further described below in conjunction with FIGS. 3 and 4.

The mapping module 240 accesses the map store 235 and identifies (e.g., as shown in step 325 of FIG. 3) candidate physical locations within a threshold distance of a geographic location. In the above example, the mapping module 240 may access information describing a map of the theme park stored in the map store 235 and identify attractions located within the theme park that are within a threshold distance (e.g., a one mile radius) from the GPS coordinates of the theme park. In some embodiments, candidate physical locations may be identified by the mapping module 240 based on boundaries described in a map of a geographic location. For example, if GPS coordinates describing a geographic location correspond to a shopping mall, the mapping module 240 may identify candidate physical locations corresponding to stores within the shopping mall based on boundaries of a building corresponding to the shopping mall. The functionality of the mapping module 240 is further described below in conjunction with FIGS. 3 and 4.

The prediction module 245 uses a machine-learning model trained by the machine-learning module 230 to predict (e.g., as shown in step 330 of FIG. 3) a physical location of a user of the online system 140, in which the physical location is predicted from multiple candidate physical locations based on a set of user attributes associated with the user. For example, the prediction module 245 may provide a set of inputs to a machine-learning model that includes demographic information associated with a user of the online system 140 and information describing candidate physical locations within a threshold distance of a geographic location of a client device 110 associated with the user. In this example, if the information describing the geographic location corresponds to GPS coordinates of a shopping mall and the candidate physical locations correspond to stores within the mall, the prediction module 245 may use the machine-learning model to predict a physical location of the user that corresponds to a store within the mall.

In some embodiments, the prediction module 245 may use the machine-learning model to predict a physical location of a user of the online system 140 based on a measure of similarity between information associated with the user and information associated with other users of the online system 140 used to train the model. For example, the prediction module 245 may provide a set of user attributes associated with a user to the trained model that includes demographic information associated with the user, candidate physical locations within a threshold distance of a geographic location of a client device 110 associated with the user, and a time at which the web server 265 (described below) received information describing the geographic location from the client device 110. In this example, the trained model may determine a measure of similarity between the user and other users for which the action logger 215 received information describing actions performed by the users (e.g., based on similarities between the demographic information and interests of users who performed actions at actual physical locations matching the candidate physical locations and similarities between the times at which the actions were performed and the time at which the online system 140 received the information describing the geographic location from the client device 110). Continuing with this example, the trained model assigns weights to the actual physical locations based on the measures of similarity, such that greater weights are assigned to the actual physical locations of users having greater measures of similarity to the user than with the actual physical locations of other users. In the above example, the trained model may then predict the physical location of the user based on the weights, such that the predicted physical location corresponds to the actual physical location assigned the greatest weight. The functionality of the prediction module 245 is further described below in conjunction with FIGS. 3 and 4.

The user location store 250 may store a predicted physical location of a user of the online system 140. The user location store 250 may store a predicted physical location of a user in association with user-identifying information associated with the user (e.g., a username that is unique to the user in the online system 140). The user location store 250 also or alternatively may store a predicted physical location of a user in association with a time associated with the user. For example, the user location store 250 may store a predicted physical location of a user in association with a time at which the web server 265 received information describing a geographic location from a client device 110 associated with the user. Furthermore, the user location store 250 may store a predicted physical location of a user of the online system 140 in association with any other suitable types of information. In the above example, the user location store 250 also may store the predicted physical location of the user in association with the information describing the geographic location. The user location store 250 is further described below in conjunction with FIG. 3.

The content selection module 255 may identify one or more content items eligible for presentation to a viewing user of the online system 140. Content items eligible for presentation to a viewing user are retrieved from the content store 210 or from another source by the content selection module 255. A content item eligible for presentation to a viewing user is a content item associated with at least a threshold number of targeting criteria satisfied by characteristics of the viewing user or is a content item that is not associated with targeting criteria. In various embodiments, the content selection module 255 includes content items eligible for presentation to a viewing user in one or more content selection processes, which identify a set of content items for presentation to the viewing user.

The content selection module 255 may rank content items eligible for presentation to a viewing user of the online system 140 and select one or more of the content items for presentation to the viewing user based on their ranking. The content selection module 255 may rank content items eligible for presentation to a viewing user of the online system 140 based on a measure of relevance associated with each content item to the viewing user or based on any other suitable criteria. The content selection module 255 may then select content items having the highest positions in the ranking or having at least a threshold position in the ranking for presentation to the viewing user. For example, the content selection module 255 determines measures of relevance of various content items eligible for presentation to a viewing user of the online system 140 to the viewing user based on characteristics associated with the viewing user and based on the viewing user's affinity for the content items. In this example, the content selection module 255 selects content items having the highest measures of relevance or having at least a threshold measure of relevance for presentation to the viewing user. Alternatively, in the above example, the content selection module 255 may rank the content items based on their measures of relevance to the viewing user and select content items having the highest ranking or having at least a threshold ranking for presentation to the viewing user.

In some embodiments, a content item eligible for presentation to a viewing user of the online system 140 identified by the content selection module 255 may be associated with a physical location. In such embodiments, a set of content items may be selected for presentation to the viewing user by the content selection module 255 based on a predicted physical location of the viewing user and the physical locations associated with content items eligible for presentation to the viewing user. For example, suppose that the prediction module 245 predicts that a physical location of a viewing user of the online system 140 is a sporting goods store and that the content selection module 255 has identified a set of candidate content items that are eligible for presentation to the viewing user (e.g., content items associated with targeting criteria that are satisfied by the viewing user). In this example, the content selection module 255 may rank the candidate content items and select a subset of the candidate content items for presentation to the viewing user based on the predicted physical location of the viewing user. Continuing with this example, content items selected by the content selection module 255 may include content items describing visits to the sporting goods store by other users of the online system 140 to whom the viewing user is connected, advertisements and/or other types of content items describing promotions for the store, etc.).

Content items selected for presentation to a viewing user of the online system 140 may be associated with bid amounts. The content selection module 255 may use the bid amounts associated with content items when selecting content for presentation to a viewing user. In various embodiments, the content selection module 255 determines an expected value associated with various content items based on their bid amounts and selects content items associated with a maximum expected value or associated with at least a threshold expected value for presentation. An expected value associated with a content item represents an expected amount of compensation to the online system 140 for presenting a content item. For example, the expected value associated with a content item is a product of the content item's bid amount and a likelihood of a viewing user presented with the content from the content item interacting with the content. The content selection module 255 may rank content items based on their associated bid amounts and select content items having at least a threshold position in the ranking for presentation to a viewing user. In some embodiments, the content selection module 255 ranks both content items not associated with bid amounts and content items associated with bid amounts in a unified ranking based on bid amounts and measures of relevance associated with content items. Based on the unified ranking, the content selection module 255 selects content for presentation to a viewing user. Selecting content items through a unified ranking is further described in U.S. patent application Ser. No. 13/545,266, filed on Jul. 10, 2012, which is hereby incorporated by reference in its entirety.

For example, the online system 140 receives a request to present a feed of content to a viewing user of the online system 140. The feed may include one or more advertisements as well as other content items, such as stories describing actions associated with other online system users connected to the viewing user. The content selection module 255 accesses one or more of the user profile store 205, the content store 210, the action log 220, and the edge store 225 to retrieve information about the viewing user. For example, stories or other data associated with users connected to the viewing user are retrieved. The retrieved stories or other content items are analyzed by the content selection module 255 to identify candidate content that is likely to be relevant to the viewing user. For example, stories associated with users not connected to the viewing user or stories associated with users for which the viewing user has less than a threshold affinity are discarded as candidate content. Based on various criteria, the content selection module 255 selects one or more of the content items identified as candidate content for presentation to the viewing user. The selected content items may be included in a feed of content that is presented to the viewing user. For example, the feed of content includes at least a threshold number of content items describing actions associated with users connected to the viewing user via the online system 140.

In various embodiments, the online system 140 presents content to a viewing user through a newsfeed including a plurality of content items selected for presentation to the viewing user. One or more advertisements also may be included in the feed. The content selection module 255 may determine the order in which selected content items are presented via the feed. For example, the content selection module 255 orders advertisements or other content items in a feed based on likelihoods of a viewing user interacting with various content items. The functionality of the content selection module 255 is further described below in conjunction with FIG. 3.

The user interface generator 260 may generate a user interface including one or more content items to be presented to viewing users of the online system 140. In some embodiments, a user interface generated by the user interface generator 260 may include one or more content items selected by the content selection module 255 for presentation to a viewing user of the online system 140. For example, the user interface generator 260 may generate a feed of content items (e.g., a newsfeed) that includes one or more content items selected by the content selection module 255, which the online system 140 presents in a display area of a mobile device associated with a viewing user. As an additional example, if the user interface generator 260 generates a display unit (e.g., a pop-up window) including a content item selected by the content selection module 255, the display unit subsequently may be presented along the right side of a display area of a client device 110 associated with a viewing user of the online system 140. The functionality of the user interface generator 260 is further described below in conjunction with FIG. 3.

The web server 265 links the online system 140 via the network 120 to the one or more client devices 110, as well as to the one or more third-party systems 130. The web server 265 serves web pages, as well as other content, such as JAVA®, FLASH®, XML and so forth. The web server 265 may receive and route messages between the online system 140 and the client device 110, for example, instant messages, queued messages (e.g., email), text messages, short message service (SMS) messages, or messages sent using any other suitable messaging technique. A user may send a request to the web server 265 to upload information (e.g., images or videos) that are stored in the content store 210. Additionally, the web server 265 may provide application programming interface (API) functionality to send data directly to native client device operating systems, such as IOS®, ANDROID™, WEBOS® or BlackberryOS.

The web server 265 receives (e.g., as shown in step 320 of FIG. 3), information describing a geographic location from a client device 110 associated with a viewing user of the online system 140. In some embodiments, the web server 265 may receive information describing a geographic location from a client device 110 associated with a viewing user of the online system 140 after identifying an opportunity to present content to the viewing user. For example, the online system 140 identifies an opportunity to present content to the viewing user upon receiving a request at the web server 265 from a client device 110 associated with the viewing user to present a profile page associated with the viewing user in the online system 140. In this example, the web server 265 subsequently may receive a set of GPS coordinates from the client device 110. In some embodiments, the web server 265 may receive information describing a geographic location from a client device 110 associated with a viewing user of the online system 140 in association with identifying an opportunity to present content to the viewing user. In the above example, the web server 265 alternatively may receive the set of GPS coordinates in association with the request to present the profile page associated with the viewing user. In some embodiments, information describing a geographic location received from a client device 110 associated with a viewing user of the online system 140 also may include a time associated with the viewing user, user-identifying information associated with the viewing user, or any other suitable types of information. In the above example, the GPS coordinates also may be associated with a timestamp indicating a date and a time at which the GPS coordinates were received from the client device 110, as well as an email address associated with the user or a client device identifier (e.g., an IP address) associated with the client device 110. The functionality of the web server 265 is further described below in conjunction with FIGS. 3 and 4.

Figure 3:
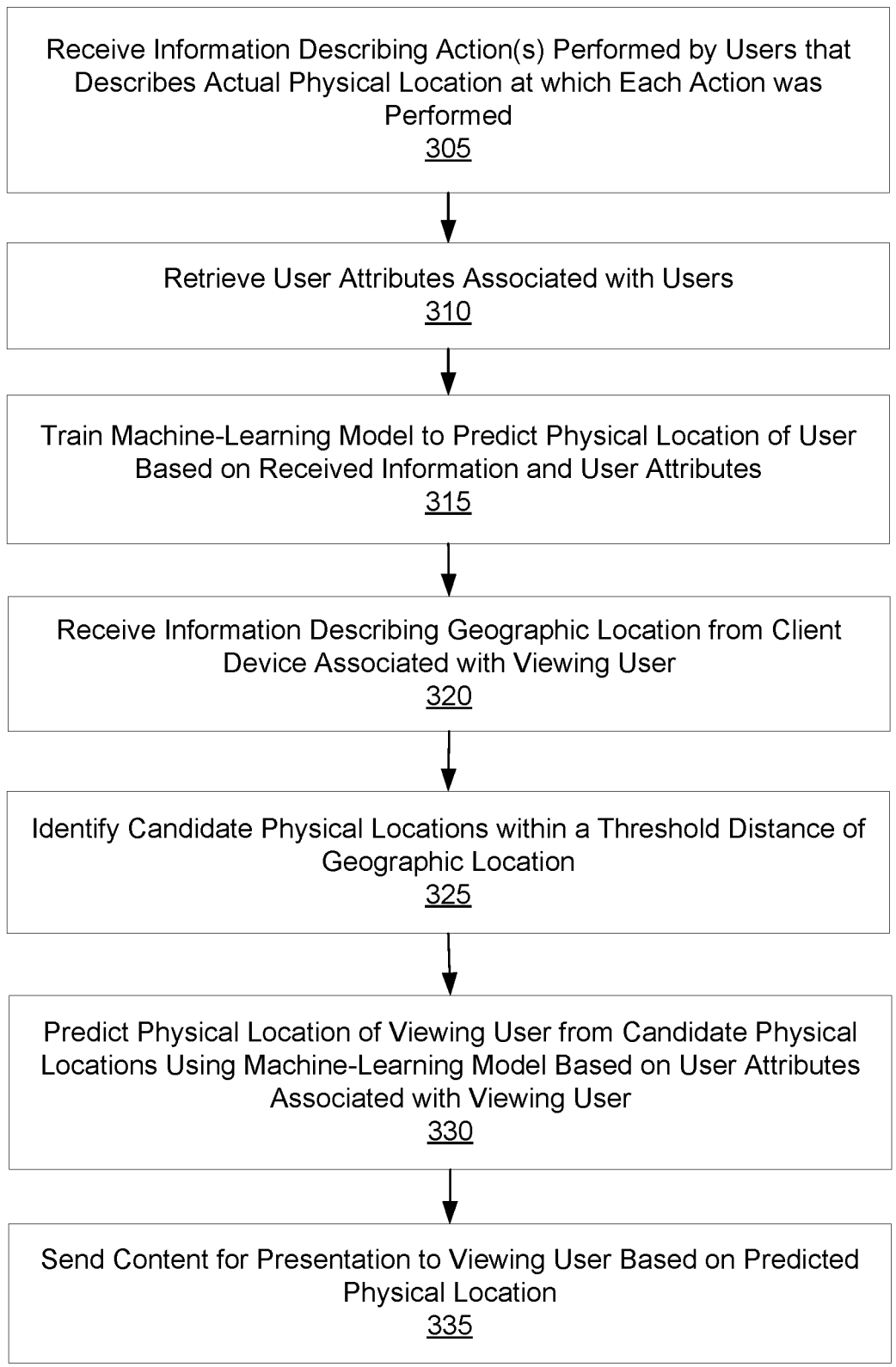
FIG. 3 is a flow chart of a method for predicting a physical location of an online system user from multiple candidate physical locations based on a geographic location of a client device associated with the online system user, in accordance with an embodiment.

Predicting a Physical Location of an Online System User from Multiple Candidate Physical Locations Based on a Geographic Location of a Client Device Associated with the Online System User FIG. 3 is a flow chart of a method for predicting a physical location of an online system user from multiple candidate physical locations based on a geographic location of a client device associated with the online system user. In other embodiments, the method may include different and/or additional steps than those shown in FIG. 3. Additionally, steps of the method may be performed in a different order than the order described in conjunction with FIG. 3.

The online system 140 receives 305 (e.g., using the action logger 215) information describing one or more actions performed by users of the online system 140, in which the information describes an actual physical location at which each action was performed. For example, the online system 140 receives 305 information describing conversions (e.g., purchases of products or services) performed by users of the online system 140, in which the information describes actual physical locations at which the conversions were performed (e.g., addresses of retail store locations at which the products or services were purchased). The information received 305 at the online system 140 may include additional types of information associated with the actions. For example, the information received 305 at the online system 140 may include a timestamp indicating a date and a time of day at which a user performed an action and a username, a user identification number, or other user-identifying information associated with the user. As an additional example, if the online system 140 receives 305 information describing a conversion event corresponding to a subscription to a service by a user of the online system 140 in the form of a receipt for the subscription, the receipt may include an address of a physical location of a retail store at which the user subscribed to the service, a description of the service (e.g., a type of service, a duration of the service, a price of the service, etc.), a time at which the user subscribed to the service, etc. In some embodiments, the online system 140 may store this information (e.g., in the action log 220 or in association with user profiles of the users in the user profile store 205). In other embodiments, the online system 140 anonymizes the user data (e.g., by aggregating the data or otherwise removing any user identifying information), which the online system 140 stores as a dataset of physical locations and information about actions performed at those locations. This dataset can thereafter be used to train the machine learning models, as described herein.

The online system 140 retrieves 310 (e.g., using the machine-learning module 230) a set of user attributes associated with each user who performed an action associated with a physical location. The online system 140 may retrieve 310 the user attributes based on information received 305 at the online system 140. For example, based on user-identifying information associated with users of the online system 140 included among the information received 305 at the online system 140, the online system 140 may retrieve 310 various types of user attributes associated with each user (e.g., from the user profile store 205, the action log 220, and/or the edge store 225). In this example, user attributes associated with an online system user may include demographic information associated with the user, information describing actions previously performed by the user, and information describing connections established between the user and other users of the online system 140 or other objects maintained in the online system 140.

The online system 140 then trains 315 (e.g., using the machine-learning module 230) a machine-learning model to predict a physical location of a user of the online system 140. The online system 140 may train 315 the model based on the information received 305 at the online system 140 and a set of user attributes associated with each of the users. The online system 140 may train 315 the model using various approaches (e.g., probabilistic matching or deterministic matching) and/or using various machine-learning algorithms (e.g., support vector machines, decision trees, etc.).

Figure 4:
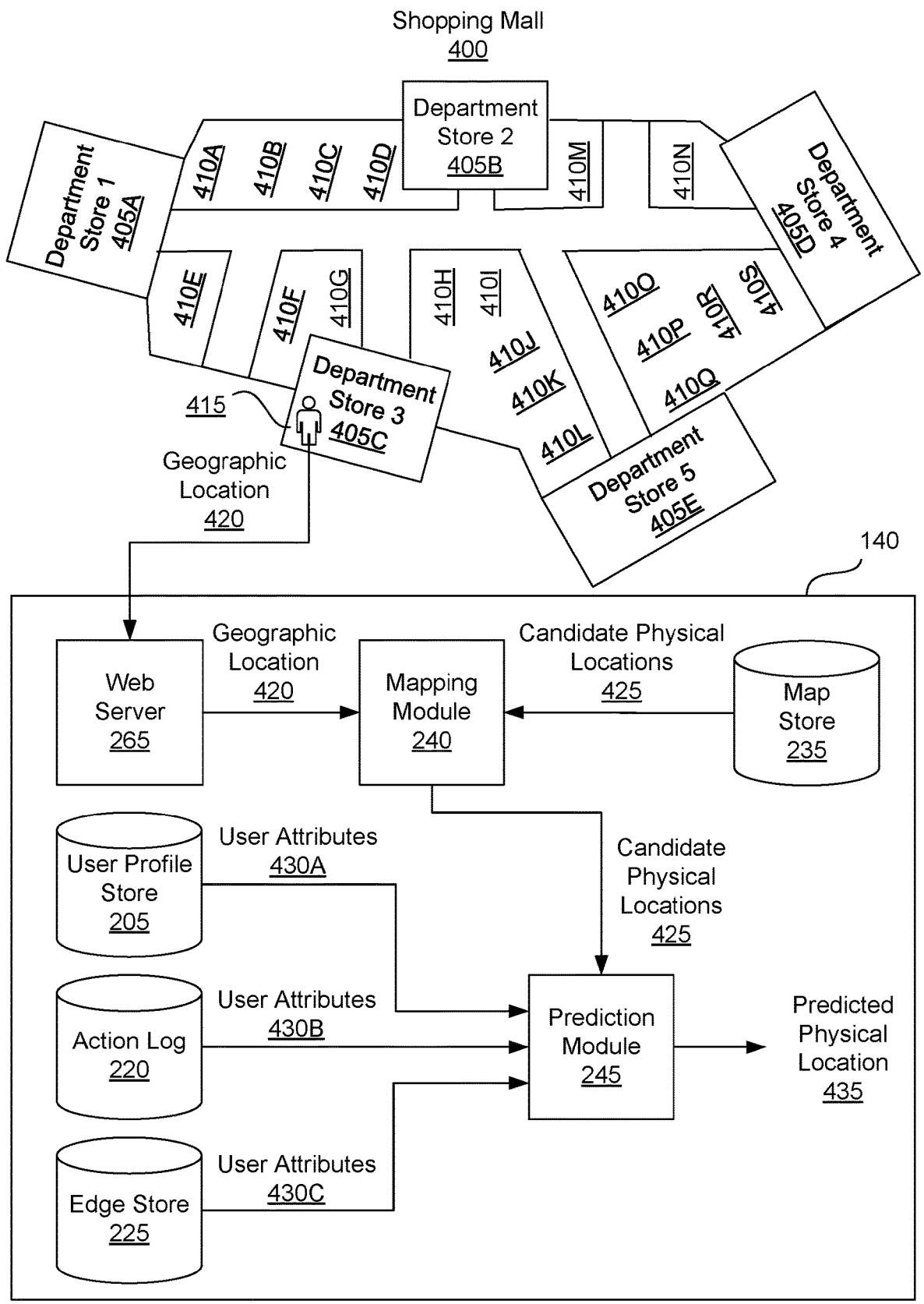
FIG. 4 is an example of predicting a physical location of an online system user from multiple candidate physical locations based on a geographic location of a client device associated with the online system user, in accordance with an embodiment.

The online system 140 subsequently receives 320 (e.g., using the web server 265) information describing a geographic location from a client device 110 associated with a viewing user of the online system 140. As shown in the example of FIG. 4, if the viewing user 415 of the online system 140 is located at a physical location corresponding to a department store (Department Store 3) 405C, which is located inside a shopping mall 400, the online system 140 may receive 320 information from the client device 110 describing its geographic location 420 in the form of a set of GPS coordinates corresponding to the shopping mall 400. In some embodiments, the information describing the geographic location received 320 from the client device 110 associated with the viewing user also may include a time associated with the viewing user, user-identifying information associated with the viewing user, or any other suitable types of information. In the above example, the GPS coordinates also may be associated with a timestamp indicating a date and a time at which the GPS coordinates were received 320 from the client device 110, as well as a username associated with the viewing user 415 in the online system 140 or a client device identifier (e.g., an IP address) associated with the client device 110. The online system 140 may receive 320 the information describing the geographic location from the client device 110 associated with the viewing user after or in association with identifying an opportunity to present content to the viewing user.

Referring back to FIG. 3, based on the information describing the geographic location received 320 from the client device 110 associated with the viewing user, the online system 140 identifies 325 (e.g., using the mapping module 240) multiple candidate physical locations within a threshold distance of the geographic location. The online system 140 may identify 325 the candidate physical locations by accessing information stored in the online system 140 (e.g., in the map store 235) describing one or more maps of the geographic location. The geographic location described by the map(s) may be identified by GPS coordinates, names, zip codes, etc. For example, based on GPS coordinates of a regional park received 320 from the client device 110 associated with the viewing user, the online system 140 identifies 325 multiple camp grounds within a threshold distance of the GPS coordinates by accessing a map of the regional park maintained in the online system 140. In some embodiments, the candidate physical locations may be identified 325 by the online system 140 based on boundaries described in one or more maps of the geographic location. As shown in the example of FIG. 4, the online system 140 may identify (in step 325) candidate physical locations 425 corresponding to department stores 405A-E and other types of stores 410A-S within the shopping mall 400 based on boundaries of a building corresponding to the shopping mall 400 by accessing information maintained in the online system 140 describing a map of the shopping mall 400.

Referring again to FIG. 3, the online system 140 uses the trained machine-learning model to predict 330 (using the prediction module 245) a physical location of the viewing user, in which the physical location is predicted 330 from the candidate physical locations based on a set of user attributes associated with the viewing user. In the example of FIG. 4, the online system 140 may provide a set of inputs to the machine-learning model that includes user attributes 430A-C associated with the viewing user 415 (e.g., demographic information, interests and hobbies, etc.) and information describing the candidate physical locations 425. In this example, the predicted physical location 435 of the viewing user 415 corresponds to a department store 405A-E or another type of store 410A-S within the shopping mall 400 included among the candidate physical locations 425. As described above in conjunction with FIG. 2, in some embodiments, the machine-learning model may be used by the online system 140 to predict 330 the physical location of the viewing user based on a measure of similarity between information associated with the viewing user and information associated with other users of the online system 140 used to train 315 the model. In some embodiments, the online system 140 may store the predicted physical location of the viewing user (e.g., in the user location store 250). In such embodiments, the predicted physical location of the viewing user may be stored in association with user-identifying information associated with the viewing user (e.g., a username), in association with a time associated with the viewing user (e.g., a time at which the online system 140 received 320 the information describing the geographic location from the client device 110 associated with the viewing user), etc.

Referring once more to FIG. 3, once the online system 140 has predicted 330 the physical location of the viewing user, the online system 140 may send 335 content for presentation to the viewing user based on the predicted physical location. The content sent 335 for presentation to the viewing user may be selected by the online system 140 (e.g., using the content selection module 255) based on the predicted physical location. For example, suppose that the online system 140 predicts 330 that the physical location of the viewing user is a restaurant within a shopping center and identifies a set of candidate content items that are eligible for presentation to the viewing user (e.g., content items associated with targeting criteria that are satisfied by the viewing user). In this example, the online system 140 may select a subset of the candidate content items for presentation to the viewing user based on the predicted physical location of the viewing user (e.g., content items describing visits to the restaurant by other users of the online system 140 to whom the viewing user is connected, advertisements and/or other types of content items describing promotions for the restaurant, etc.). The content may be sent 335 for presentation to the viewing user via a user interface generated by the online system 140 (e.g., using the user interface generator 260). For example, the online system 140 may generate a feed of content items (e.g., a newsfeed) that includes one or more content items selected for presentation to the viewing user, which is sent 335 to the client device 110 associated with the viewing user and presented in a display area of the client device 110.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving information describing one or more actions performed by a set of users of an online system, the information describing an actual physical location at which each of the one or more actions was performed;

retrieving a first set of user demographic attributes associated with each of the set of users based at least in part on the received information;

training a machine-learning model to predict a physical location of a user of the online system, the machine-learning model trained based at least in part on the received information and the first set of user demographic attributes;

receiving information describing a geographic location from a client device associated with a viewing user of the online system;

identifying a plurality of candidate venues within a threshold distance of the geographic location;

predicting, using the machine-learning model, a venue from the plurality of candidate venues in which the viewing user is located by applying the machine-learning model to a second set of user demographic attributes associated with the viewing user, wherein the predicting comprises:

comparing the second set of user demographic attributes associated with the viewing user to the first set of user demographic attributes associated with other users in the set of users, and weighting, based on a similarity between the first set of user demographic attributes associated with other users and the second set of user demographic attributes associated with the viewing user, the plurality of candidate venues;

retrieving, based on the predicted venue, a plurality of content items associated with the venue; and sending, in response to the predicting the venue, the plurality of content items associated with the venue for presentation to the viewing user based at least in part on the predicted venue in which the viewing user is located.

2. The method of claim 1, wherein the one or more actions performed by the set of users are selected from the group consisting of: performing a conversion at the actual physical location, checking-in to the actual physical location, and any combination thereof.

3. The method of claim 1, wherein the information describing the one or more actions performed by the set of users further comprises a time at which each of the set of users performed the one or more actions.

4. The method of claim 1, wherein the information describing the geographic location further comprises a time associated with the viewing user.

5. The method of claim 1, wherein predicting the venue of the viewing user comprises:

determining a measure of similarity between the viewing user and the set of users based at least in part on the first set of user demographic attributes and the second set of user demographic attributes.

6. The method of claim 1, wherein sending the plurality of content items for presentation to the viewing user comprises:

identifying a set of candidate content items eligible for presentation to the viewing user based at least in part on the second set of user demographic attributes associated with the viewing user, wherein a subset of the set of candidate content items are associated with one or more physical locations;

selecting a set of content items from the set of candidate items for presentation to the viewing user based at least in part on the predicted venue of the viewing user and the one or more physical locations associated with the subset of candidate content items; and sending the selected set of content items for presentation to the viewing user.

7. The method of claim 1, wherein the information describing the one or more actions performed by the set of users of the online system comprises user-identifying information associated with each of the set of users.

8. The method of claim 1, wherein one or more of the first set of user demographic attributes and the second set of user demographic attributes comprise information stored in association with a user profile associated with a user of the online system.

9. The method of claim 1, wherein the first set of user demographic attributes associated with each of the set of users comprises information describing an additional geographic location associated with each of the set of users that is within the threshold distance of the actual physical location at which each of the one or more actions was performed.

10. The method of claim 1, wherein the information describing the geographic location received from the client device associated with the viewing user comprises a set of GPS coordinates.

11. A computer program product comprising a non-transitory computer readable storage medium having instructions encoded thereon that, when executed by a processor, cause the processor to:

receive information describing one or more actions performed by a set of users of an online system, the information describing an actual physical location at which each of the one or more actions was performed;

retrieve a first set of user demographic attributes associated with each of the set of users based at least in part on the received information;

train a machine-learning model to predict a physical location of a user of the online system, the machine-learning model trained based at least in part on the received information and the first set of user demographic attributes;

receive information describing a geographic location from a client device associated with a viewing user of the online system;

identify a plurality of candidate venues within a threshold distance of the geographic location;

predict, using the machine-learning model, a venue from the plurality of candidate venues in which the viewing user is located by applying the machine-learning model to a second set of user demographic attributes associated with the viewing user wherein the predicting comprises:

comparing the second set of user demographic attributes associated with the viewing user to the first set of user demographic attributes associated with other users in the set of users, and weighting, based on a similarity between the first set of user demographic attributes associated with other users and the second set of user demographic attributes associated with the viewing user, the plurality of candidate venues;

retrieve, based on the predicted venue, a plurality of content items associated with the venue; and send, in response to the predicting the venue, the plurality of content items associated with the venue for presentation to the viewing user based at least in part on the predicted venue in which the user is located.

12. The computer program product of claim 11, wherein the one or more actions performed by the set of users are selected from the group consisting of: performing a conversion at the actual physical location, checking-in to the actual physical location, and any combination thereof.

13. The computer program product of claim 11, wherein the information describing the one or more actions performed by the set of users further comprises a time at which each of the set of users performed the one or more actions.

14. The computer program product of claim 11, wherein the information describing the geographic location further comprises a time associated with the viewing user.

15. The computer program product of claim 11, wherein predict the venue of the viewing user comprises:
    determine a measure of similarity between the viewing user and the set of users based at least in part on the first set of user demographic attributes and the second set of user demographic attributes.

16. The computer program product of claim 11, wherein send the plurality of content items for presentation to the viewing user comprises:
    identify a set of candidate content items eligible for presentation to the viewing user based at least in part on the second set of user demographic attributes associated with the viewing user, wherein a subset of the set of candidate content items are associated with one or more physical locations;
    select a set of content items from the set of candidate items for presentation to the viewing user based at least in part on the predicted venue of the viewing user and the one or more physical locations associated with the subset of candidate content items; and
    send the selected set of content items for presentation to the viewing user.

17. The computer program product of claim 11, wherein the information describing the one or more actions performed by the set of users of the online system comprises user-identifying information associated with each of the set of users.

18. The computer program product of claim 11, wherein one or more of the first set of user demographic attributes and the second set of user demographic attributes comprise information stored in association with a user profile associated with a user of the online system.

19. The computer program product of claim 11, wherein the first set of user demographic attributes associated with each of the set of users comprises information describing an additional geographic location associated with each of the set of users that is within the threshold distance of the actual physical location at which each of the one or more actions was performed.

20. The computer program product of claim 11, wherein the information describing the geographic location received from the client device associated with the viewing user comprises a set of GPS coordinates.

* * * * *